(12) United States Patent
Segawa et al.

(10) Patent No.: US 12,186,815 B2
(45) Date of Patent: Jan. 7, 2025

(54) CUTTING TOOL

(71) Applicants: SUMITOMO ELECTRIC HARDMETAL CORP., Hyogo (JP); SUMITOMO ELECTRIC INDUSTRIES, LTD., Osaka (JP)

(72) Inventors: Mayuka Segawa, Hyogo (JP); Naoki Watanobe, Hyogo (JP); Taisuke Higashi, Hyogo (JP); Takashi Harada, Hyogo (JP); Satoru Kukino, Osaka (JP)

(73) Assignees: SUMITOMO ELECTRIC HARDMETAL CORP., Hyogo (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/011,441

(22) PCT Filed: Jun. 17, 2021

(86) PCT No.: PCT/JP2021/023085
§ 371 (c)(1),
(2) Date: Dec. 19, 2022

(87) PCT Pub. No.: WO2021/261380
PCT Pub. Date: Dec. 30, 2021

(65) Prior Publication Data
US 2023/0182218 A1    Jun. 15, 2023

(51) Int. Cl.
*B23C 5/10*    (2006.01)
*B23B 27/20*    (2006.01)

(52) U.S. Cl.
CPC ............ *B23C 5/1018* (2013.01); *B23B 27/20* (2013.01); *B23B 2222/28* (2013.01); *B23B 2226/315* (2013.01); *B23B 2265/34* (2013.01)

(58) Field of Classification Search
CPC ........... B23C 5/10; B23C 5/1009; B23C 5/16; B23C 5/165; B23C 2210/086;
(Continued)

(56) References Cited

U.S. PATENT DOCUMENTS 960,526 A * 6/1910 Erlandsen ............... B23B 27/10
407/50
3,548,476 A * 12/1970 Cave ......................... B23C 5/10
407/54
(Continued)

FOREIGN PATENT DOCUMENTS

CH    539483 A * 1/1971
CN    102328126 A    1/2012
(Continued)

OTHER PUBLICATIONS

Sumiya et al., Application of Nano-Polycrystalline Diamond to Cutting Tools, Oct. 2012, SEI Technical Review No. 75, pp. 18-23. (Year: 2012).*

(Continued)

*Primary Examiner* — Nicole N Ramos
(74) *Attorney, Agent, or Firm* — Renner, Otto, Boisselle & Sklar, LLP

(57) ABSTRACT

A cutting tool rotates about a rotation axis, and includes a tip end portion. The tip end portion includes a partially spherical surface that is brought into contact with a workpiece. The surface is provided with a plurality of recesses disposed apart from each other. An opening edge of each of the plurality of recesses constitutes a cutting edge.

14 Claims, 7 Drawing Sheets

(58) Field of Classification Search
CPC ........ B23C 2210/326; B23C 2210/486; B23C 2226/31; B23C 2226/315
See application file for complete search history.

(56) References Cited

U.S. PATENT DOCUMENTS

| | | | | |
|---|---|---|---|---|
| 4,285,618 | A | * | 8/1981 | Shanley, Jr. ............... B23C 5/10 407/57 |
| 4,593,777 | A | * | 6/1986 | Barr ...................... E21B 10/567 175/379 |
| 4,770,567 | A | * | 9/1988 | Moriarty ................... B23C 5/10 407/59 |
| 4,796,709 | A | * | 1/1989 | Lynde ...................... B23B 5/168 166/55.6 |
| 5,984,005 | A | * | 11/1999 | Hart ...................... E21B 29/002 166/55.6 |
| 6,951,563 | B2 | * | 10/2005 | Wolford ............. A61B 17/1666 606/81 |
| 7,232,311 | B1 | * | 6/2007 | Greggs .................... A61C 3/02 433/165 |
| 7,399,147 | B1 | * | 7/2008 | VanDyke, Jr. .......... B23C 5/003 407/53 |
| 9,144,845 | B1 | * | 9/2015 | Grzina ................... B23D 77/00 |
| 9,884,376 | B2 | * | 2/2018 | Huth ........................ B23C 5/10 |
| 2005/0133277 | A1 | * | 6/2005 | Dixon .................. B23C 5/1009 175/426 |
| 2010/0226726 | A1 | * | 9/2010 | Strasmann ............. B23C 5/003 407/54 |
| 2012/0020749 | A1 | * | 1/2012 | Maeda ..................... B23C 5/10 407/42 |
| 2014/0186629 | A1 | | 7/2014 | Ikeda et al. |
| 2015/0125226 | A1 | | 5/2015 | Yano et al. |
| 2015/0209054 | A1 | * | 7/2015 | Atabey .............. A61B 17/1615 606/80 |
| 2019/0054545 | A1 | | 2/2019 | Harada et al. |
| 2019/0283150 | A1 | * | 9/2019 | Stojanovski .......... B23C 5/1009 |
| 2019/0358718 | A1 | * | 11/2019 | Kuroda ..................... B23C 5/10 |
| 2021/0031282 | A1 | | 2/2021 | Kobayashi et al. |
| 2021/0114117 | A1 | | 4/2021 | Harada et al. |

FOREIGN PATENT DOCUMENTS

| | | | | | |
|---|---|---|---|---|---|
| CN | 204248056 | U | | 4/2015 | |
| CN | 104741673 | A | * | 7/2015 | ........... B23C 5/1009 |
| CN | 106424883 | A | * | 2/2017 | ........... B23C 5/1009 |
| CN | 207900316 | U | | 9/2018 | |
| EP | 3646976 | A1 | | 5/2020 | |
| EP | 3778084 | A1 | | 2/2021 | |
| GB | 2082102 | A | | 3/1982 | |
| JP | S57-054018 | A | | 3/1982 | |
| JP | S59-090566 | U | | 6/1984 | |
| JP | S63-172512 | U | | 11/1988 | |
| JP | H04-045616 | U | | 4/1992 | |
| JP | 06335814 | A | * | 12/1994 | |
| JP | H10-113808 | A | | 5/1998 | |
| JP | 2006-281376 | A | | 10/2006 | |
| JP | 2006-315088 | A | | 11/2006 | |
| JP | 2008-122370 | A | | 5/2008 | |
| JP | 2008-229838 | A | | 10/2008 | |
| JP | 3161423 | U | | 7/2010 | |
| JP | 2011-088264 | A | | 5/2011 | |
| JP | 2013-28500 | A | | 2/2013 | |
| JP | 2013-200211 | A | | 10/2013 | |
| JP | 2013-212572 | A | | 10/2013 | |
| JP | 2014-000663 | A | | 1/2014 | |
| JP | 2014-83642 | A | | 5/2014 | |
| JP | 5567622 | B2 | | 8/2014 | |
| JP | 2015-044275 | A | | 3/2015 | |
| JP | 2017-119333 | A | | 7/2017 | |
| JP | 2018-008363 | A | | 1/2018 | |
| JP | 2019-525883 | A | | 9/2019 | |
| JP | 6696105 | B1 | | 5/2020 | |
| WO | WO-2013145286 | A1 | * | 10/2013 | ............... B23C 5/00 |
| WO | WO-2017169303 | A1 | * | 10/2017 | ............. B21D 37/01 |
| WO | 2018/005406 | A1 | | 1/2018 | |
| WO | WO-2018092364 | A1 | * | 5/2018 | ............. B23B 27/14 |
| WO | 2018/116524 | A1 | | 6/2018 | |
| WO | 2019/003965 | A1 | | 1/2019 | |
| WO | WO-2019180873 | A1 | * | 9/2019 | ............... B23C 5/10 |
| WO | WO-2020139945 | A1 | * | 7/2020 | ............... B23B 47/34 |
| WO | 2020/250499 | A1 | | 12/2020 | |

OTHER PUBLICATIONS

Machine Translation of JP-06335814-A. (Year: 2023).*
Machine Translation of WO-2018092364-A1 (Year: 2023).*
WO-2019180873-A1 machine translation (Year: 2024).*
JP 3161423 U Machine Translation (Year: 2024).*
Office Action for corresponding JP Application No. 2022-510162, dated Mar. 16, 2022.

* cited by examiner

CUTTING TOOL

The present application claims priority based on PCT/JP2020/024454, PCT/JP2020/024455, and PCT/JP2020/024456, which are international applications filed on Jun. 22, 2020. The entire contents described in these applications are incorporated herein by reference.

TECHNICAL FIELD

The present disclosure relates to a cutting tool.

BACKGROUND ART

WO 2018/116524 A (PTL 1) and Japanese Patent Laying-Open No. 2013-212572 (PTL 2) describe cutting tools.

The cutting tool described in PTL 1 has a flat negative land and a flat flank face, and a cutting edge contiguous with the negative land and the flank face. A plurality of recessed portions are formed in at least one of the negative land and the flank face.

The cutting tool described in PTL 2 has a cutting edge and a rake face contiguous with the cutting edge, and the rake face has a plurality of recessed portions.

CITATION LIST

Patent Literature

PTL 1: WO 2018/116524 A
PTL 2: Japanese Patent Laying-Open No. 2013-212572

SUMMARY OF INVENTION

A cutting tool of the present disclosure rotates about a rotation axis and includes a tip end portion. The tip end portion includes a partially spherical surface that is brought into contact with a workpiece. The surface is provided with a plurality of recesses disposed apart from each other. An opening edge of each of the plurality of recesses constitutes a cutting edge.

DETAILED DESCRIPTION

Figure 1:
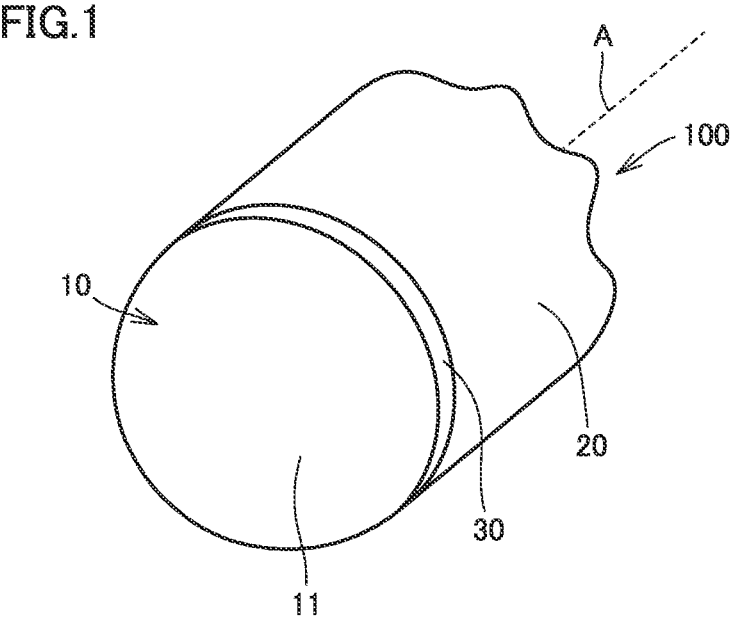
FIG. 1 is a perspective view of a cutting tool 100.

Problem to be Solved by the Present Disclosure

In the cutting tool described in PTL 1, a workpiece is cut by a cutting edge, and recessed portions on a negative land and a flank face are provided in order to reduce contact resistance with the workpiece. Also in the cutting tool described in PTL 2, a workpiece is cut by a cutting edge, and a recessed portion of a rake face is provided in order to reduce contact resistance with the workpiece.

The present disclosure provides a cutting tool that performs cutting by an opening edge of a recessed portion provided on a partially spherical surface.

Advantageous Effect of the Present Disclosure

According to the cutting tool of the present disclosure, cutting can be performed by an opening edge of a recessed portion provided on a partially spherical surface.

DESCRIPTION OF EMBODIMENTS

Hereinafter, an embodiment of the present disclosure will be listed and described.

(1) The cutting tool according to the embodiment rotates about a rotation axis and includes a tip end portion. The tip end portion includes a partially spherical surface that is brought into contact with a workpiece. The surface is provided with a plurality of recesses disposed apart from each other. An opening edge of each of the plurality of recesses constitutes a cutting edge.

According to the cutting tool of (1), cutting can be performed by the opening edges of the recessed portions provided on the partially spherical surface.

(2) In the cutting tool of (1), the tip end portion may be formed of binderless cubic boron nitride or nano polycrystalline diamond.

(3) In the cutting tool of (2), to the nano polycrystalline diamond, atoms belonging to the group 13 or 15 of the long form of the periodic table may be added.

(4) In the cutting tool of (1) to (3), each of the plurality of recesses may have a side surface continuous with the opening edge. For recesses greater than or equal to of the plurality of recesses, an angle between the side surface and a portion of the surface continuous with the opening edge may be greater than or equal to 80° and less than or equal to 160°.

(5) In the cutting tool of the above (1) to (4), the plurality of recesses may be arranged such that trajectories of the plurality of recesses cover all of the surface when the cutting tool is rotated about the rotation axis.

(6) In the cutting tool of (1) to (5), the surface may be provided with a plurality of flutes extending radially from a central portion of the surface. The plurality of recesses may be disposed at portions of the surface between the plurality of flutes.

(7) The cutting tool of (1) to (6) may be used with a cut depth of less than or equal to 10 µm.

DETAILS OF EMBODIMENTS

Details of the embodiment according to the present disclosure will be described with reference to the drawings. In the following drawings, the same or corresponding parts are denoted by the same reference numerals, and redundant description will not be repeated. The cutting tool according to the embodiment is referred to as a cutting tool 100.

(Configuration of Cutting Tool 100)

Hereinafter, the configuration of cutting tool 100 will be described.

FIG. 1 is a perspective view of cutting tool 100. As illustrated in FIG. 1, cutting tool 100 is, for example, a ball end mill. Cutting tool 100 is rotated about a rotation axis A to perform cutting on a workpiece. Cutting tool 100 is used for cutting a workpiece with a cut depth of less than or equal to 10 µm, for example. Cutting tool 100 includes a tip end portion 10, a main body 20, and a connection layer 30.

Tip end portion 10 is located at the tip of cutting tool 100 in the direction along the rotation axis A. Tip end portion 10 has a surface 11. Surface 11 is partially spherical. Surface 11 has a hemispherical shape, for example. Surface 11 is brought into contact with the workpiece. Tip end portion 10 is formed of binderless cubic boron nitride (cBN), for example.

The binderless cubic boron nitride includes a plurality of cubic boron nitride grains. The rest of the binderless cubic boron nitride may contain boron nitride having a crystal structure other than a cubic crystal such as hexagonal boron nitride (hBN) or wurtzite boron nitride (wBN), as well as inevitable impurities, but does not contain a binder. That is, in the binderless cubic boron nitride, the cubic boron nitride grains are directly bonded to each other without a binder. The amount of the inevitable impurities is preferably as small as possible, but may be several percent with respect to the total mass.

In the binderless cubic boron nitride, a median size of the cubic boron nitride crystal grains is less than 1 µm, for example. In the binderless cubic boron nitride, the median size of the cubic boron nitride crystal grains is preferably less than or equal to 0.05 µm. In the binderless cubic boron nitride, the median size of the cubic boron nitride crystal grains is greater than or equal to 0.01 µm, for example.

The median size of the cubic boron nitride crystal grains is measured, for example, by the following method. First, a scanning electron microscope (SEM) image in a cross section of tip end portion 10 is taken. The size of the measurement visual field is 12 µm×15 µm, and the observation magnification is 10,000 times. The five SEM images are taken at different positions.

Secondly, distributions of equivalent circle diameters of the cubic boron nitride crystal grains are calculated by performing image analysis on each of the five SEM images using image processing software (Win Roof Ver. 7.4.5). The median size of the cubic boron nitride crystal grains is calculated based on the distribution of the equivalent circle diameters. The average value of the median sizes obtained from the five SEM images is defined as the median size of the cubic boron nitride crystal grains.

Tip end portion 10 may be formed of nano polycrystalline diamond. The nano polycrystalline diamond contains a plurality of diamond crystal grains. The rest of the nano polycrystalline diamond may contain inevitable impurities, but does not contain a binder. That is, in the nano polycrystalline diamond, the plurality of diamond crystal grains are directly bonded to each other. The inevitable impurities are hydrogen and oxygen, for example.

In the nano polycrystalline diamond, the median size of diamond crystal grains is less than 1 µm, for example. Preferably, in the nano polycrystalline diamond, the median size of diamond crystal grains is less than or equal to 0.5 µm, for example. In the nano polycrystalline diamond, the median size of diamond crystal grains is greater than or equal to 0.01 µm, for example. The median size of the diamond crystal grains is measured by the same method as the median size of the cubic boron nitride crystal grains.

Atoms belonging to group 13 or 15 of the long form of the periodic table may be added to the nano polycrystalline diamond. The atoms belonging to Group 13 of the long form of the periodic table are boron (B), aluminum (Al), and gallium (Ga), for example. The atoms belonging to Group 15 of the long form of the periodic table are nitrogen (N), phosphorus (P), and arsenic (As), for example.

In the nano polycrystalline diamond to which the atoms are added, a part of carbon atoms in the diamond crystal structure may be substituted with the atoms described above, or the atoms described above may be inserted between carbon and carbon. The concentration of the atoms to be added is, for example, greater than or equal to 1 ppm and less than or equal to 10,000 ppm. The concentration of the atoms added to the nano polycrystalline diamond can be measured by secondary ion mass spectrometry (SIMS) analysis, for example.

Main body 20 is, for example, a shank. Main body 20 is made of, for example, cemented carbide. Main body 20 extends along the rotation axis A. Main body 20 has, for example, a circular shape in a cross-sectional view orthogonal to rotation axis A. Tip end portion 10 is attached to a tip end of main body 20 in the direction along rotation axis A. Tip end portion 10 is attached to main body 20 via connection layer 30. Tip end portion 10 is attached to main body 20 by, for example, brazing. That is, connection layer 30 is, for example, a brazing material.

(Detailed Configuration of Surface 11)

Figure 2:
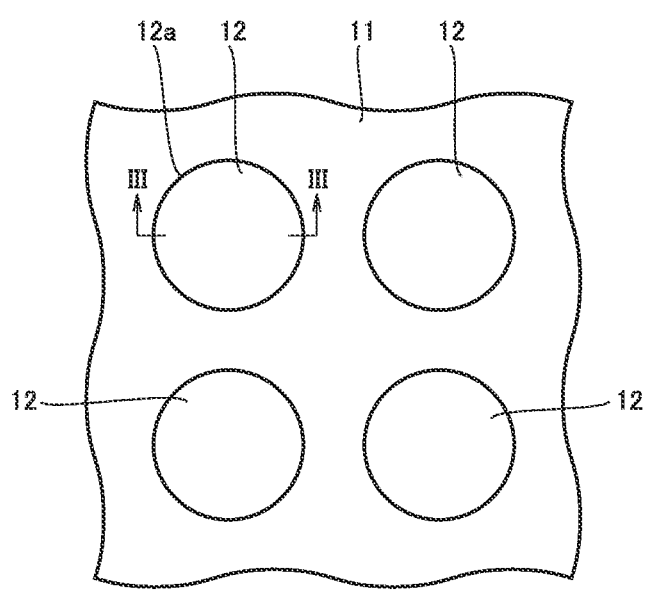
FIG. 2 is a schematic enlarged view of a surface 11.

FIG. 2 is a schematic enlarged view of the surface 11. As illustrated in FIG. 2, a plurality of recesses 12 are formed on surface 11. Each of the plurality of recesses 12 is disposed apart from each other. In plan view, recess 12 is, for example, circular. Recess 12 may not be circular in plan view.

The equivalent circle diameter of recess 12 is, for example, less than or equal to 100 µm. The equivalent circle diameter of recess 12 is, for example, greater than or equal to 1 µm. The equivalent circle diameter of recess 12 is preferably greater than or equal to 1 µm and less than or equal to 71 µm. The equivalent circle diameter of recess 12 is a square root of a value obtained by dividing an area of recess 12 in plan view by π/4.

A ratio of a total area of the plurality of recesses 12 to an area of surface 11 (hereinafter referred to as an "area ratio of recesses 12") is, for example, greater than or equal to 1%. The area ratio of recesses 12 is preferably greater than or equal to 1% and less than or equal to 80%. The area ratio of recesses 12 is, for example, less than or equal to 85%.

The ratio of the total area of the plurality of recesses 12 to the area of surface 11 is measured by the following method. First, an SEM image of surface 11 is taken. At this time, the size of the measurement visual field is 200 µm×200 µm, and the magnification is 500 times. The five SEM images are taken at different positions. Secondly, the ratio of the total area of the plurality of recesses 12 to the area of surface 11 is calculated for each of the five SEM images. The average value of the total ratios of the areas of the plurality of recesses 12 to the area of surface 11 obtained from the five SEM images is taken as the area ratio of recesses 12.

Figure 3:
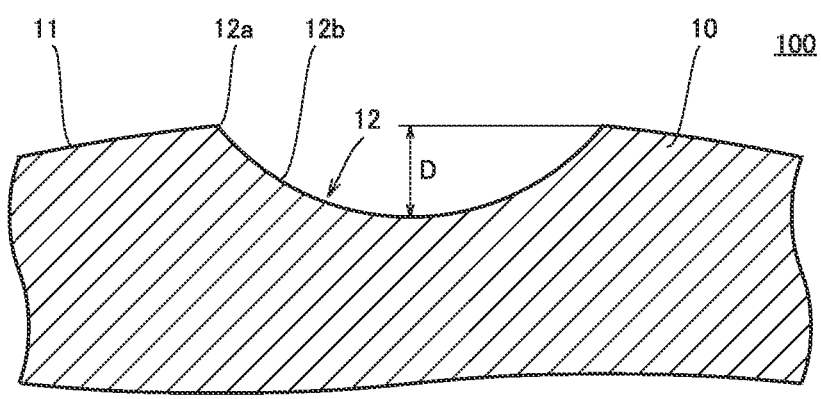
FIG. 3 is a cross-sectional view taken along line III-III in FIG. 2.

FIG. 3 is a cross-sectional view taken along line III-III in FIG. 2. Recess 12 has an opening edge 12a and a side surface 12b continuous with opening edge 12a. Opening edge 12a constitutes a cutting edge of cutting tool 100. That is, opening edge 12a is a sharp edge. A depth of recess 12 is defined as a depth D. Depth D is a distance between opening edge 12a and the bottom of recess 12 in a cross-sectional view passing through the center of recess 12 in a plan view and orthogonal to surface 11. Recess 12 is measured by an optical measuring device or a non-contact three-dimensional measuring device. Depth D is, for example, less than or equal to 25 µm. Depth D is preferably greater than or equal to 1 µm and less than or equal to 25 µm. Depth D is, for example, greater than or equal to 0.1 µm.

Figure 4:
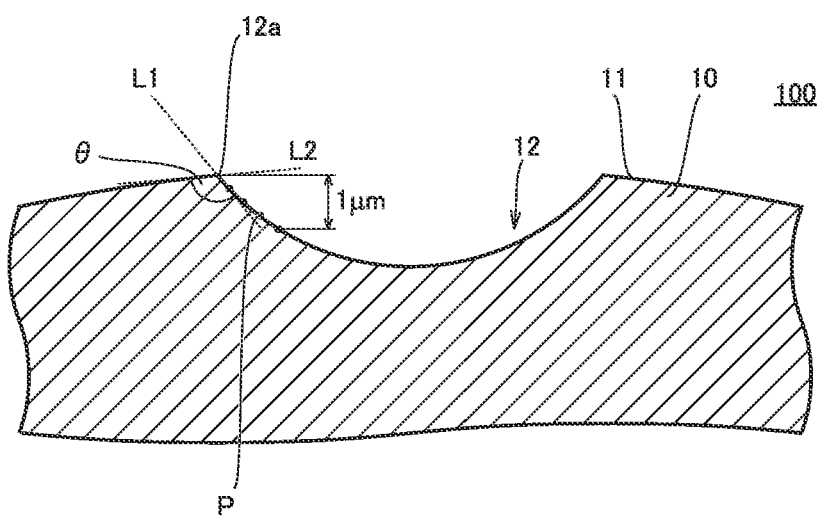
FIG. 4 is a schematic diagram illustrating a method of measuring an angle θ.

Surface 11 continuous with opening edge 12a and side surface 12b makes an angle θ. FIG. 4 is a schematic diagram illustrating a method of measuring angle θ. Angle θ is measured by the method illustrated in FIG. 4. First, in a cross-sectional view passing through the center of recess 12 in a plan view, coordinates of a plurality of measurement points P on side surface 12b are measured. The coordinates of measurement points P are measured by an optical measuring device or a non-contact three-dimensional measuring device. The plurality of measurement points P are sequentially arranged at equal intervals (0.2 μm intervals) from opening edge 12a to positions where the distance from opening edge 12a is 1 μm. Secondly, a curved line representing side surface 12b is determined based on the coordinates of each of the plurality of measurement points P.

Thirdly, an angle formed by a tangent line L1 and a tangent line L2 is calculated. Tangent line L1 is a tangent line at opening edge 12a of the curved line representing side surface 12b. Tangent line L2 is a tangent line at opening edge 12a of a curved line indicating a portion of surface 11 continuous with opening edge 12a. An angle formed by tangent line L1 and tangent line L2 is angle θ.

Angle θ is, for example, less than or equal to 170°. Angle θ is preferably greater than or equal to 80o and less than or equal to 160° in recesses greater than or equal to 80% of the plurality of recesses 12. Note that angle θ is measured for arbitrary 10 of the plurality of recesses 12, and if angle θ falls within the range of greater than or equal to 80° and less than or equal to 1600 for 8 or more of the recesses, it is considered that "angle θ is greater than or equal to 80° and less than or equal to 160° in the recesses greater than or equal to 80% of the plurality of recesses 12".

Figure 5:
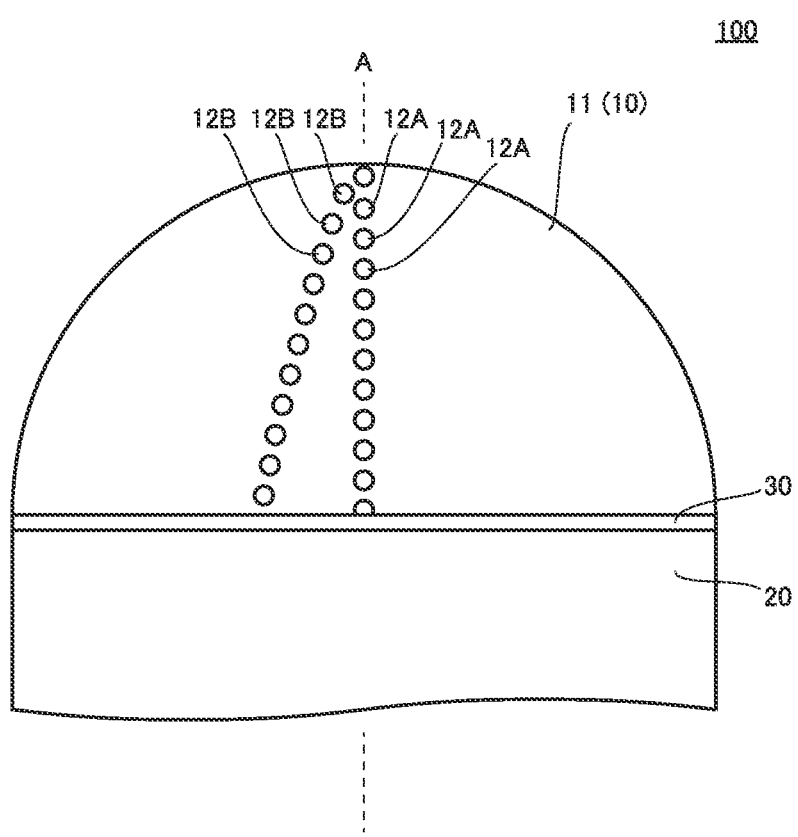
FIG. 5 is a schematic view of a tip end portion 10 illustrating arrangement of recesses 12.

FIG. 5 is a schematic view of tip end portion 10 illustrating the arrangement of recesses 12. As illustrated in FIG. 5, the plurality of recesses 12 are arranged in a plurality of rows extending from a central portion of surface 11, for example. In FIG. 5, only two columns adjacent to each other among the plurality of columns are illustrated. Each of the plurality of columns includes a plurality of recesses 12. One of the plurality of columns is defined as a first column. Another one of the plurality of columns adjacent to the first column is defined as a second column. Recesses 12 belonging to the first row are referred to as recesses 12A. Recesses 12 belonging to the second row are referred to as recesses 12B.

In the direction along rotation axis A, recess 12B is disposed between two adjacent recesses 12A, for example. The equivalent circle diameter of recess 12B (recess 12A) is larger than, for example, an interval between two adjacent recesses 12A (an interval between two adjacent recesses 12B). Therefore, trajectories of the plurality of recesses 12A and recesses 12B cover all of surface 11 when cutting tool 100 is rotated about rotation axis A.

Recesses 12 are formed, for example, by irradiating surface 11 with a laser. The laser is, for example, a YAG laser. The shape of recesses 12 (equivalent circle diameter, angle θ, and depth D) changes depending on laser irradiation conditions. The laser irradiation conditions include, for example, an average power (unit: W), a repetition frequency (unit: Hz), and a laser scanning speed (unit: mm/min). Table 1 shows the shape of recesses 12 when the laser irradiation condition is changed.

TABLE 1

| Average power (W) | Repetition frequency (Hz) | Laser scanning speed (mm/min) | Angle θ (°) | Depth D (mm) |
|---|---|---|---|---|
| 1 | 50 | 100 | 138 | 0.004 |
| 3 | 50 | 100 | 115 | 0.009 |
| 5 | 50 | 100 | 91 | 0.019 |

Modified Example

Figure 6:
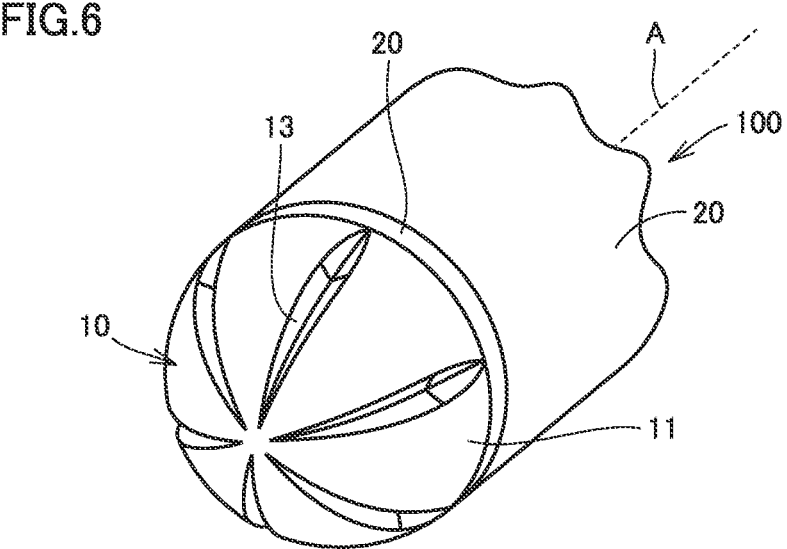
FIG. 6 is a perspective view of the cutting tool 100 according to a modified example.

FIG. 6 is a perspective view of cutting tool 100 according to a modified example. As illustrated in FIG. 6, a plurality of flutes 13 may be provided on surface 11. Flutes 13 extend radially from the central portion of surface 11. Although not shown, the plurality of recesses 12 are located between adjacent flutes 13. Edges of flutes 13 function as cutting edges of cutting tool 100 together with opening edges 12a.

Effects of Cutting Tool According to Embodiment

Hereinafter, effects of cutting tool 100 will be described in comparison with a cutting tool according to a comparative example (hereinafter referred to as a "cutting tool 200").

Figure 7:
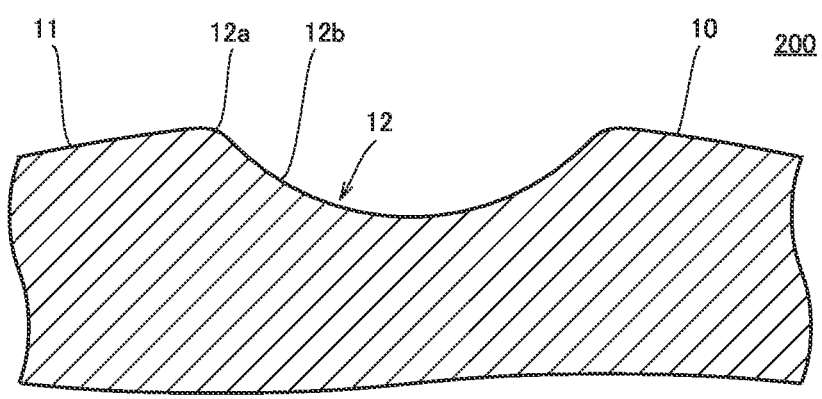
FIG. 7 is a schematic cross-sectional view of a cutting tool 200.

FIG. 7 is a schematic cross-sectional view of cutting tool 200. FIG. 7 illustrates a cross section of cutting tool 200 passing through the center of recess 12 in plan view and orthogonal to surface 11. In cutting tool 200, recess 12 is formed to reduce contact resistance with the workpiece. As illustrated in FIG. 7, in cutting tool 200, in order to prevent a breakage of opening edge 12a, opening edge 12a passes through the center of recess 12 in a plan view and has an R shape in a cross-sectional view orthogonal to surface 11. As a result, in cutting tool 200, opening edge 12a does not function as a cutting edge.

On the other hand, in cutting tool 100, since opening edge 12a is a sharp edge, opening edge 12a can function as a cutting edge. As described above, by rotating cutting tool 100 about rotation axis A while surface 11 is in contact with the workpiece, cutting tool 100 can perform cutting on the workpiece.

In a case where the plurality of recesses 12 are arranged such that the trajectories of the plurality of recesses 12 cover all of surface 11 when cutting tool 100 is rotated about rotation axis A, the all of surface 11 can be subjected to cutting on the workpiece, and the cutting efficiency of cutting tool 100 is improved. In this case, it is possible to improve the processing quality of the workpiece after the cutting (glossiness and surface roughness of the workpiece after the cutting).

When the plurality of flutes 13 are provided on surface 11, not only opening edge 12a but also the edges of flutes 13 functions as a cutting edge, and the cutting efficiency of cutting tool 100 is improved.

(Cutting Test)

In order to confirm the effect of cutting tool 100, a cutting test was performed. For the cutting test, a first cutting condition, a second cutting condition, a third cutting condition, a fourth cutting condition, a fifth cutting condition, a sixth cutting condition, a seventh cutting condition, and an eighth cutting condition were applied. The first to eighth cutting conditions are shown in Table 2.

TABLE 2

| | Rotation speed | Feed amount | Cut depth | Cut width | Coolant | Cutting method | Workpiece | Workpiece hardness (HRA) |
|---|---|---|---|---|---|---|---|---|
| First cutting condition | 40,000 rotations/min | 300 mm/min | 0.005 mm | 0.002 mm | Oil mist | Down cutting | Cemented carbide | 91 |
| Second cutting condition | 40,000 rotations/min | 300 mm/min | 0.003 mm | 0.002 mm | Dry processing | Down cutting | Quartz glass | — |
| Third cutting condition | 40,000 rotations/min | 300 mm/min | 0.003 mm | 0.002 mm | Oil mist | Down cutting | Cemented carbide | 91 |
| Fourth cutting condition | 40,000 rotations/min | 300 mm/min | 0.003 mm | 0.002 mm | Oil mist | Down cutting | Cemented carbide | 71 |
| Fifth cutting condition | 40,000 rotations/min | 300 mm/min | 0.004 mm | 0.002 mm | Oil mist | Down cutting | Cemented carbide | 71 |
| Sixth cutting condition | 40,000 rotations/min | 300 mm/min | 0.004 mm | 0.002 mm | Oil mist | Down cutting | Cemented carbide | 91 |
| Seventh cutting condition | 40,000 rotations/min | 300 mm/min | 0.003 mm | 0.002 mm | Oil mist | Down cutting | Cemented carbide | 67 |
| Eighth cutting condition | 40,000 rotations/min | 800 mm/min | 0.005 mm | 0.005 mm | Oil mist | Down cutting | Hardened steel | 77.4 |

Under the first cutting condition to the seventh cutting condition, the rotation speed, the feed amount, the cutting width, and the cutting method of cutting tool 100 were respectively 40,000 rotations/min, 300 mm/min, 0.002 mm, and down cutting. In the eighth cutting condition, the rotation speed, the feed amount, the cut width, and the cutting method of cutting tool 100 were respectively set to 40,000 rotations/min, 800 mm/min, 0.005 mm, and down cutting. Under the first cutting condition and the third cutting condition to the seventh cutting condition, the workpiece was made of cemented carbide. In the second cutting condition, the workpiece was made of quartz glass. In the eighth cutting condition, the workpiece was made of hardened steel. Under the first to eighth cutting conditions, a plane of 5 mm×5 mm was cut.

Under the first cutting condition and the eighth cutting condition, the cut depth was 0.005 mm. Under the second cutting condition to the fourth cutting condition and the seventh cutting condition, the cut depth was 0.003 mm. Under the fifth cutting condition and the sixth cutting condition, the cut depth was 0.004 mm. Under the first cutting condition and the third cutting condition to the eighth cutting condition, cutting was performed while mist-like oil was supplied as a coolant. Under the second cutting condition, the cutting was performed by dry machining (that is, no coolant is supplied).

In the cutting test, a dimensional error from a target shape of the workpiece after cutting of each sample (hereinafter, referred to as a "dimensional error"), a glossiness of the workpiece after cutting (hereinafter, referred to as a "glossiness"), and an arithmetic average roughness of the workpiece after cutting (hereinafter, referred to as a "surface roughness") were evaluated. When the absolute value of the dimensional error was less than 4 μm, each sample was evaluated as functioning as a cutting tool. When the absolute value of the dimensional error was greater than or equal to 4 μm, it was evaluated that each sample did not function as a cutting tool.

The glossiness was measured using a gloss meter. The specular reflectivity at an incident angle of 60° of a black mirror glass plate having a refractive index of 1.567 was defined as a case where the glossiness was 100 (specular glossiness).

In the cutting test, samples 1 to 30 were provided as samples of cutting tool 100. In each of samples 1 to 30, the presence or absence of recess 12, depth D, the equivalent circle diameter of recess 12, the area ratio of recess 12, angle θ, and the material of tip end portion 10 were changed. In Table 3, "NPD" means nano polycrystalline diamond, "B-NPD" means nano polycrystalline diamond doped with boron, and "BL-CBN" means a binderless cubic boron nitride.

In sample 27, the plurality of recesses 12 were not arranged such that trajectories of the plurality of recesses 12 cover all of surface 11 when rotated about rotation axis A. In sample 28, the plurality of recesses 12 were arranged such that trajectories of the plurality of recesses 12 cover all of surface 11 when rotated about rotation axis A. In sample 29, the plurality of flutes 13 were provided on surface 11.

A condition A is that depth D is greater than or equal to 1 μm. A condition B is that the equivalent circle diameter of recess 12 is greater than or equal to 1 μm. A condition C is that the area ratio of recess 12 is greater than or equal to 1%.

TABLE 3

| | Cutting conditions | Depth D (mm) | Equivalent circle diameter (mm) | Area ratio (%) | Angle θ (°) | Material of tip end portion 10 | Glossiness | Surface roughness (nm) | Dimensional error |
|---|---|---|---|---|---|---|---|---|---|
| Sample 1 | First cutting condition | — | — | — | — | NPD | 350 | 8 | −4 |

TABLE 3-continued

| | Cutting conditions | Depth D (mm) | Equivalent circle diameter (mm) | Area ratio (%) | Angle θ (°) | Material of tip end portion 10 | Glossiness | Surface roughness (nm) | Dimensional error |
|---|---|---|---|---|---|---|---|---|---|
| Sample 2 | First cutting condition | 0.1 | 0.5 | 1 | 169.8 | NPD | 353 | 8.1 | −4 |
| Sample 3 | First cutting condition | 3 | 1 | 10 | 90.4 | NPD | 452 | 5.8 | −0.05 |
| Sample 4 | Second cutting condition | 2.9 | 1 | 18 | 91 | NPD | Glossy | 8 | ±0.05 |
| Sample 5 | Second cutting condition | 3 | 1.2 | 19 | 89 | B-NPD | Glossy | 6 | ±0.05 |
| Sample 6 | Third cutting condition | 0.1 | 48 | 21 | 89 | NPD | 349 | 7 | −2.5 |
| Sample 7 | Third cutting condition | 0.3 | 49.9 | 20.1 | 90 | NPD | 359 | 7.1 | −2 |
| Sample 8 | Third cutting condition | 1 | 51 | 20 | 90 | NPD | 441 | 6.2 | −1 |
| Sample 9 | Third cutting condition | 5 | 51.1 | 19 | 91 | NPD | 460 | 4 | ±0.05 |
| Sample 10 | Third cutting condition | 22 | 50 | 16 | 89 | NPD | 453 | 6 | ±0.05 |
| Sample 11 | Fourth cutting condition | 4.8 | 0.5 | 19 | 91 | NPD | 451 | 6.3 | −1 |
| Sample 12 | Fourth cutting condition | 4.9 | 10 | 19 | 90 | NPD | 458 | 6.2 | ±0.05 |
| Sample 13 | Fourth cutting condition | 4.8 | 46 | 22 | 89 | NPD | 460 | 5 | ±0.05 |
| Sample 14 | Fourth cutting condition | 4.9 | 71 | 21 | 91 | NPD | 429 | 6 | ±0.05 |
| Sample 15 | Fourth cutting condition | 5.1 | 98 | 18 | 91 | NPD | 350 | 7.8 | ±0.05 |
| Sample 16 | Fifth cutting condition | 4.6 | 46 | 1 | 89 | NPD | 438 | 6.1 | −2 |
| Sample 17 | Fifth cutting condition | 5.2 | 48 | 3 | 90 | NPD | 441 | 6 | −2 |
| Sample 18 | Fifth cutting condition | 5 | 50 | 10 | 90 | NPD | 453 | 5 | −1 |
| Sample 19 | Fifth cutting condition | 4.9 | 44 | 21 | 90 | NPD | 460 | 4.3 | ±0.05 |
| Sample 20 | Fifth cutting condition | 5 | 48 | 38 | 91 | NPD | 452 | 5.1 | ±0.05 |
| Sample 21 | Fifth cutting condition | 5.1 | 49 | 80 | 89 | NPD | 428 | 6.8 | ±0.05 |
| Sample 22 | Fifth cutting condition | 4.7 | 49 | 85 | 88 | NPD | 410 | 7 | ±0.05 |
| Sample 23 | Sixth cutting condition | 4.5 | 49 | 19 | 91 | NPD | 453 | 4.3 | ±0.05 |
| Sample 24 | Sixth cutting condition | 4.9 | 50 | 17 | 112 | NPD | 451 | 5.2 | ±0.05 |
| Sample 25 | Sixth cutting condition | 5.2 | 51 | 18 | 159 | NPD | 438 | 6 | ±0.05 |
| Sample 26 | Sixth cutting condition | 4.8 | 51 | 20 | 170 | NPD | 420 | 8.2 | ±0.05 |

TABLE 3-continued

|  | Cutting conditions | Depth D (mm) | Equivalent circle diameter (mm) | Area ratio (%) | Angle θ (°) | Material of tip end portion 10 | Glossiness | Surface roughness (nm) | Dimensional error |
|---|---|---|---|---|---|---|---|---|---|
| Sample 27 | Seventh cutting condition | 4.6 | 45 | 17 | 92 | NPD | 362 | 8.2 | −2.1 |
| Sample 28 | Seventh cutting condition | 5.3 | 51 | 23 | 90 | NPD | 438 | 5.1 | ±0.05 |
| Sample 29 | Seventh cutting condition | 4.9 | 50 | 21 | 89 | NPD | 390 | 8.1 | ±0.05 |
| Sample 30 | Eighth cutting condition | 3 | 1 | 20 | 90 | BL-CBN | 519 | 15 | ±0.05 |

As shown in Table 3, no recess 12 was provided in sample 1. In sample 2, recess 12 was provided. However, in sample 2, condition C was satisfied, but condition A and condition B were not satisfied. On the other hand, in samples 3 to 30, two or more of conditions A to C were satisfied.

As the dimensional error of sample 1 and sample 2 was greater than or equal to 4 μm, and sample 1 and sample 2 could not be evaluated as functioning as a cutting tool. On the other hand, as the dimensional error of samples 3 to 30 was less than 4 μm, samples 3 to 30 functioned as a cutting tool. From this comparison, it was experimentally revealed that opening edge 12a functions as a cutting edge when recess 12 satisfies two or more of conditions A to C.

In samples 4 and 5, depth D, the equivalent circle diameter of recess 12, and the area ratio of recess 12 were about the same. In sample 4, tip end portion 10 was formed of nano polycrystalline diamond, whereas in sample 5, the tip end portion was formed of nano polycrystalline diamond doped with boron. In sample 5, a lower surface roughness was obtained as compared with sample 4. From this comparison, it has been experimentally found that the processing quality when cutting processing is performed on glass is improved by providing tip end portion 10 made of nano polycrystalline diamond doped with boron.

In samples 6 to 10, the equivalent circle diameter of recess 12 was in a range of 50 μm±2 μm. In samples 6 to 10, the area ratio of recess 12 was within a range of 20%±4%, and the angle θ was within a range of 90°±1°. In samples 6 to 10, depth D was sequentially increased.

In samples 8 to 10, depth D was in a range greater than or equal to 1 μm and less than or equal to 25 μm, and high glossiness and low surface roughness were obtained. From this, it has been experimentally found that, by setting depth D to be greater than or equal to 1 μm and less than or equal to 25 μm, the processing quality when cutting is performed using cutting tool 100 is improved.

In samples 11 to 15, depth D was in a range of 5 μm±0.2 μm. In samples 11 to 15, the area ratio of recess 12 was within a range of 20%+2%, and angle θ was within a range of 90°±1°. In samples 11 to 15, the equivalent circle diameter of recess 12 was sequentially increased.

In samples 12 to 14, the equivalent circle diameter of recess 12 was in a range greater than or equal to 1 μm and less than or equal to 71 μm, and high glossiness and low surface roughness were obtained. From this, it has been experimentally found that, by setting the equivalent circle diameter of recess 12 to be greater than or equal to 1 μm and less than or equal to 71 μm, the processing quality when cutting is performed using cutting tool 100 is improved.

In samples 16 to 22, depth D was in a range of 5 μm f 0.4 μm. In samples 16 to 22, the equivalent circle diameter of recess 12 was within a range of 48 μm+2 μm, and angle θ was within a range of 90°±2°. In samples 16 to 22, the area ratio of recess 12 was sequentially increased.

In samples 16 to 21, the area ratio of recess 12 was in a range of greater than or equal to 1% and less than or equal to 80%, and high glossiness and low surface roughness were obtained. From this, it has been experimentally found that by setting the area ratio of recesses 12 to be greater than or equal to 1% and less than or equal to 80%, the processing quality when cutting is performed using cutting tool 100 is improved.

In samples 23 to 26, depth D was in a range of 5 μm±0.5 μm. In samples 23 to 26, the equivalent circle diameter of recess 12 was within a range of 50 μm f 1 μm, and the area ratio of recess 12 was within a range of 18%±2%. In samples 23 to 26, angle θ was sequentially increased. In samples 23 to 25, angle θ was in a range greater than or equal to 80° and less than or equal to 160°, and high glossiness and low surface roughness were obtained. From this, it has been experimentally found that by setting angle θ to be greater than or equal to 80° and less than or equal to 1600, the processing quality when cutting is performed using cutting tool 100 is improved.

In sample 28, high glossiness and low surface roughness were obtained as compared with sample 27. From this, it has been experimentally found that by providing the plurality of recesses 12 such that the trajectories of the plurality of recesses 12 cover all of surface 11 when rotated about rotation axis A, processing quality when cutting processing is performed using cutting tool 100 is improved.

In sample 30, high glossiness and surface roughness were obtained. From this, it has been experimentally found that by providing tip end portion 10 made of binderless cubic boron nitride, the processing quality when cutting processing is performed to hardened steel using cutting tool 100 is improved.

The embodiment disclosed herein should be considered to be illustrative in all respects and not restrictive. The scope of the present invention is defined by the claims, instead of the embodiment stated above, and it is intended that meanings equivalent to the claims and all modifications within the scope are included.

REFERENCE SIGNS LIST

10: tip end portion, 11: surface, 12: recess, 12a: opening edge, 12b: side surface, 13: flute, 20: main body, 30:

connection layer, 100: cutting tool, 200: cutting tool, θ: angle, A: rotation axis, D: depth, L1, L2: tangent line, P: measurement point.

The invention claimed is:

1. A cutting tool that rotates about a rotation axis, the cutting tool comprising:
   a tip end portion, wherein
   the tip end portion includes a partially spherical surface that is brought into contact with a workpiece,
   the partially spherical surface is provided with a plurality of concave indentations recessed into the partially spherical surface, defining a plurality of recesses, each recess having a bottom surface and being disposed apart from each other, and
   a sharp opening edge of each of the plurality of recesses defined at an intersection between an upper most portion of the recess and the partially spherical surface constitutes a cutting edge,
   wherein the opening edge of each of the plurality of recesses has in plan view an equivalent circle diameter having a closed shape, the equivalent circle diameter being greater than or equal to 1 μm and less than or equal to 100 μm, wherein the equivalent circle diameter of each of the recesses is a square root of a value obtained by dividing an area of the recess in plan view by πT/4; and
   the tip end portion is formed of binderless cubic boron nitride or nano polycrystalline diamond.

2. The cutting tool according to claim 1, wherein the nano polycrystalline diamond has atoms belonging to the group 13 or 15 of the long form of the periodic table.

3. The cutting tool according to claim 1, wherein
   each of the plurality of recesses has a side surface continuous with the opening edge, and
   for 80% or greater than 80% of the plurality of recesses, an angle between a first line that is tangent to the side surface and a second line that is tangent to a portion of a surface continuous with the opening edge is greater than or equal to 80° and less than or equal to 160°.

4. The cutting tool according to claim 1, wherein the plurality of recesses are arranged such that trajectories that the plurality of recesses follow as the cutting tool is rotated about the rotation axis cover all of the partially spherical surface of the tip end portion.

5. The cutting tool according to claim 1, wherein the cutting tool is configured to cut into a workpiece a cut having a depth of less than or equal to 10 μm.

6. The cutting tool according to claim 2, wherein
   each of the plurality of recesses has a side surface continuous with the opening edge, and
   for 80% or greater than 80% of the plurality of recesses, an angle between a first line that is tangent to the side surface and a second line that is tangent to a portion of the surface continuous with the opening edge is greater than or equal to 80° and less than or equal to 160°.

7. The cutting tool according to claim 2, wherein the plurality of recesses are arranged such that trajectories that the plurality of recesses follow as the cutting tool is rotated about the rotation axis cover all of the partially spherical surface of the tip end portion.

8. The cutting tool according to claim 3, wherein the plurality of recesses are arranged such that trajectories that the plurality of recesses follow as the cutting tool is rotated about the rotation axis cover all of the partially spherical surface of the tip end portion.

9. The cutting tool according to claim 2, wherein the cutting tool is configured to cut into a workpiece a cut having a depth of less than or equal to 10 μm.

10. The cutting tool according to claim 3, wherein the cutting tool is configured to cut into a workpiece a cut having a depth of less than or equal to 10 μm.

11. The cutting tool according to claim 4, wherein the cutting tool is configured to cut into a workpiece a cut having a depth of less than or equal to 10 μm.

12. The cutting tool according to claim 6, wherein the cutting tool is configured to cut into a workpiece a cut having a depth of less than or equal to 10 μm.

13. The cutting tool according to claim 7, wherein the cutting tool is configured to cut into a workpiece a cut having a depth of less than or equal to 10 μm.

14. The cutting tool according to claim 8, wherein the cutting tool is configured to cut into a workpiece a cut having a depth of less than or equal to 10 μm.

* * * * *